United States Patent [19]

Little

[11] 4,096,636
[45] Jun. 27, 1978

[54] MOTORCYCLE WHEEL ALIGNMENT TOOL

[76] Inventor: Michael D. Little, 5718 N. 18th Pl., Phoenix, Ariz. 85016

[21] Appl. No.: 735,151

[22] Filed: Oct. 26, 1976

[51] Int. Cl.² ............. G01B 3/30; G01B 5/255
[52] U.S. Cl. ............. 33/169 R; 33/180 AT; 33/203
[58] Field of Search ............ 33/168 B, 169 R, 180 R, 33/180 AT, 181 AT, 193, 203, 203.15, 203.16, 203.17, 203.18, 203.19, 203.20, 203.21, 84

[56] References Cited

U.S. PATENT DOCUMENTS

| | | | |
|---|---|---|---|
| 460,434 | 9/1891 | Feus | 33/193 |
| 1,804,448 | 5/1931 | Wochner | 33/203.17 |
| 2,524,168 | 10/1950 | Harnish, Jr. et al. | 33/180 R |
| 2,566,435 | 9/1951 | Trimmer | 33/169 R |
| 3,088,214 | 5/1963 | Bennett | 33/203.15 |

FOREIGN PATENT DOCUMENTS

| | | | |
|---|---|---|---|
| 220,706 | 7/1958 | Australia | 33/203.15 |
| 612,276 | 11/1948 | United Kingdom | 33/169 R |

Primary Examiner—Richard E. Aegerter
Assistant Examiner—Richard R. Stearns
Attorney, Agent, or Firm—Cahill, Sutton & Thomas

[57] ABSTRACT

A manually operated alignment tool for the wheels of a motorcycle which, on making a two point contact with the tire sidewall of each wheel, assures alignment of the wheels. The tool includes a bar and, when necessary, a spacer disposed at one end of the bar and of a width equal to one-half of the difference in width between the front and rear tires. The tool is positioned to have the bar contact the sidewalls along a common side of the area and front tires or, if used, the spacer is brought into contact with the sidewall of the front tire. In the event all four points of contact are not made and indicative of misaligned wheels, the rear wheel axle if pivoted fore and aft until all four contact points are achieved.

5 Claims, 11 Drawing Figures

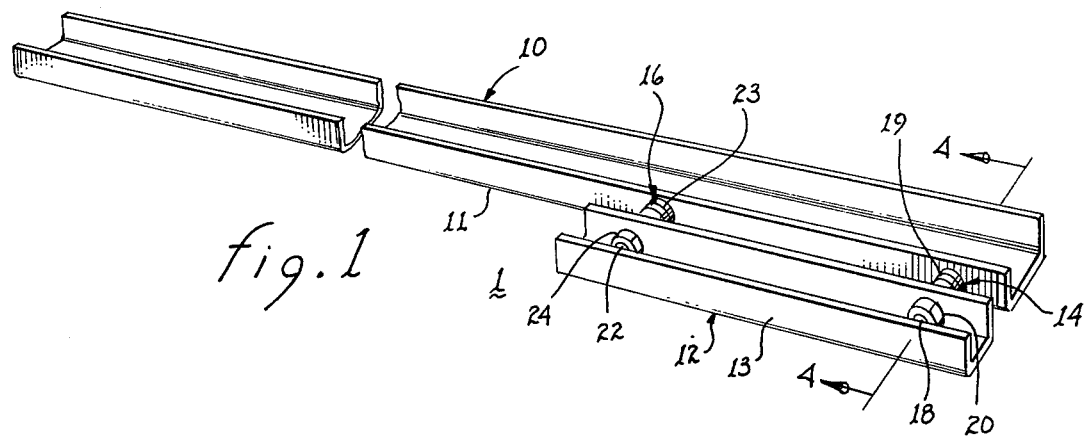
fig. 1
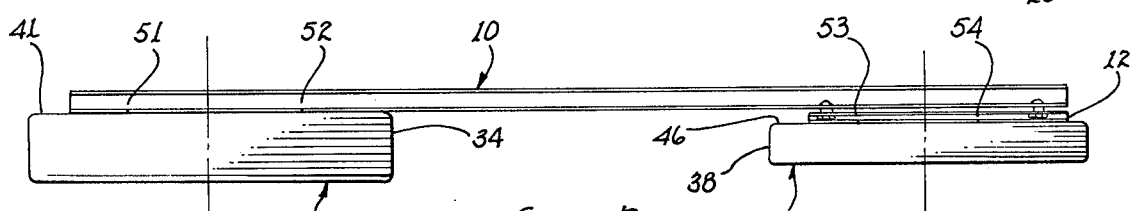
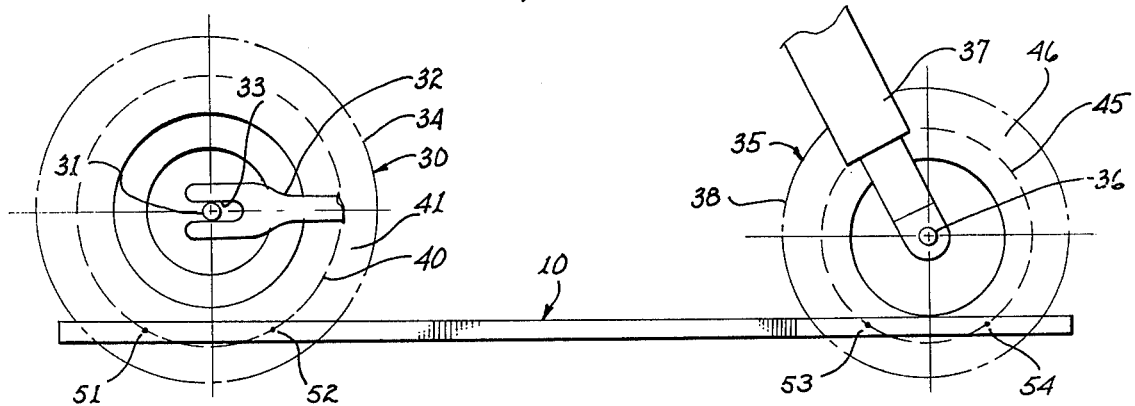
fig. 2
fig. 3
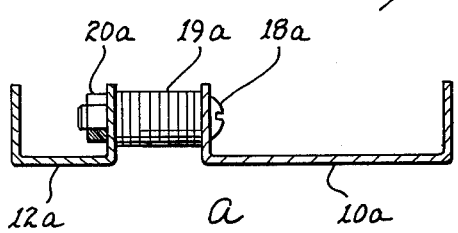 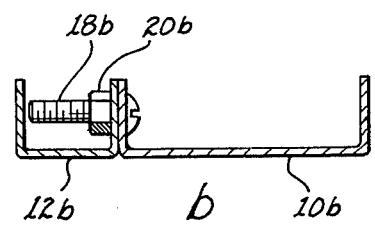
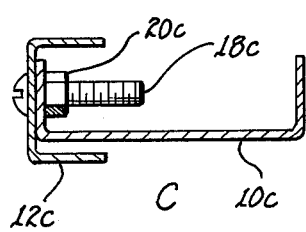 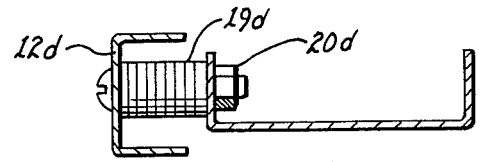
fig. 4

MOTORCYCLE WHEEL ALIGNMENT TOOL

The present invention relates to alignment devices and, more particularly, to alignment tools for aligning the wheels of a motorcycle.

The prior art is replete with various apparatus for setting the caster, camber, tow-in and tracking of the wheels of four wheeled vehicles. Invariably, each such apparatus is large and cumbersome and must be oriented with respect to a fixed point, usually the frame of the vehicle. Moreover, they cannot be used to align the wheels of a motorcycle. United States patents representative of apparatus of this type include: Nos. 1,804,448, 2,474,616, 3,305,936 and 3,786,572.

U.S. Pat. No. 3,088,214, describes a relatively simple alignment device for aligning a rear wheel of a vehicle with a corresponding front wheel. Elements of the device are attached to the hub of the rear and front wheels and a line is extended from the rear wheel mounted element to the front wheel mounted element along a predetermined course. Alignment of the wheels is effected by adjusting the wheels such that the line is superimposed upon predetermined mark on the front wheel mounted element. Necessarily, some subjective determination must be exercised in effecting wheel alignment by this method. With respect to motorcycles, this alignment device has no utility in that the motorcycle frame and engine preclude positioning of the line in the manner taught in the patent. Moreover, the requirement for attaching the elements to the hubs of the wheels precludes their use on motorcycle wheels as the latter have completely different types of hubs.

An earlier United States patent issued in 1926, No. 1,591,485, is directed to a device for leveling and/or aligning machinery equipment. The operative elements of the device are a tautened wire and gauge. The position of the wire upon the gauge, which gauge includes adjustable elements, provides the operator with an indication of the degree of level or alignment. As with the above described patent employing a line, the device described herein requires subjective judgment by the operator and the accuracy of the device is a function of the operator's skill.

Presently, the wheels of a motorcycle are aligned by positioning the axle of the rear wheel in correspondence with pre-superimposed marks upon the supporting fork of the frame. Only upon the assumption that the front fork is accurately mounted with respect to the frame, that the frame was constructed true and that the attachment of the engine and other parts did not distend nor distort the frame, can this presently used method achieve accurate alignment. Through experience, it has been learned that discrepancies in one or more of these three areas are not unusual in most presently commercially available motorcycles. Consequently, positioning of the rear wheel in accordance with the superimposed marks probably will not result in accurate alignment of the rear wheel with the front wheel.

Inaccurate wheel alignment affects handling of a motorcycle and, at high speed, may induce what is known as high speed "wobble". Should high speed wobble occur, the motorcycle becomes essentially uncontrollable and many accidents have resulted. Misalignment also has other more pedantic effects such as unnecessary tire wear, gas consumption and a higher rate of deterioration of the mechanical components.

It is therefore a primary object of the present invention to provide an alignment tool for the wheels of a motorcycle.

Another object of the present invention is to provide an alignment tool for the wheels of a motorcycle which is based upon completely objective criteria.

Yet another object of the present invention is to provide a manually operated alignment tool for motorcycle wheels.

Yet another object of the present invention is to provide an alignment tool for motorcycle wheels which is adjustable for differences in tire width between the front and rear tires.

A yet further object of the present invention is to provide an alignment tool for motorcycles which is readily adjustable to accommodate a wide range of width difference between the front and rear tires.

A still further object of the present invention is to provide a lightweight inexpensive alignment tool for the wheels of a motorcycle.

These and other objects of the present invention will become apparent to those skilled in the art as the description thereof proceeds.

The present invention will be described with reference to the following figures, in which:

FIG. 1 is a perspective view of the alignment tool.

FIG. 2 is a top view of the alignment tool positioned adjacent the tires of the wheels of a motorcycle.

FIG. 3 is a side view of the alignment tool positioned adjacent the tires of the wheels of a motorcycle.

FIGS. 4a, 4b, 4c and 4d are cross-sectional views of the bar and spacer illustrated in FIG. 1 showing variations in positioning the spacer with respect to the bar.

Figure 5:
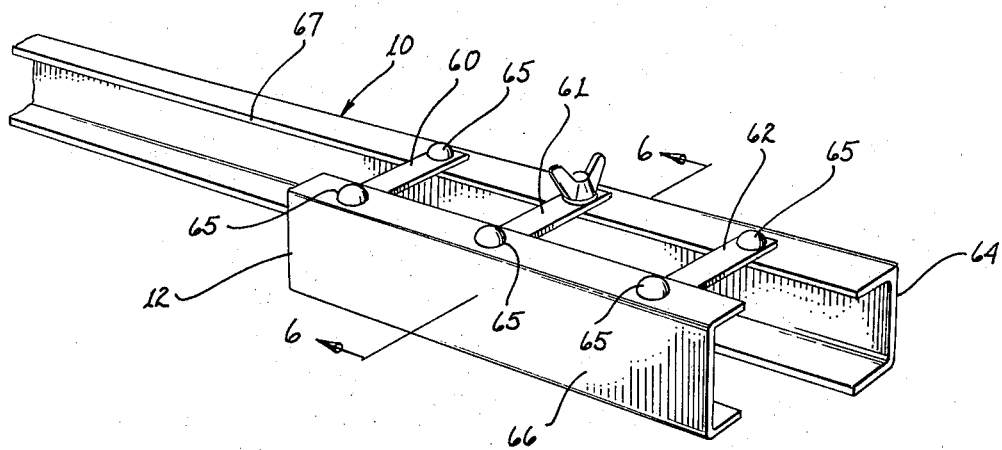
FIG. 5 is a perspective view illustrating a variant of the alignment tool.
Figure 6:
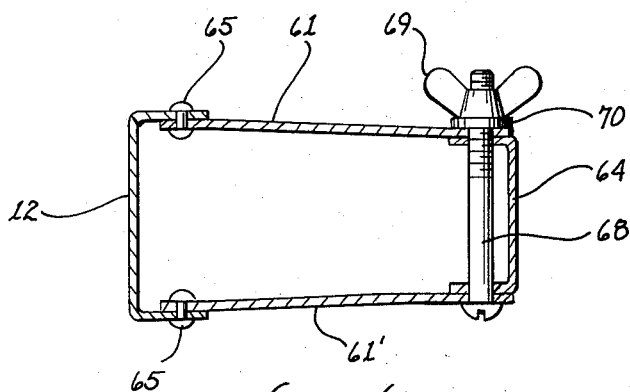
FIG. 6 is a cross-sectional view of the variant taken along lines 6—6, as shown in FIG. 5.

The structure of alignment tool 1 will be described with respect to FIG. 1. The tool includes a bar 10 and a detachably mounted spacer 12. For ease of handling, both the bar and spacer are manufactured of lightweight but relatively rigid material, such as channels of aluminum as depicted in the figure. Spacer 12 is detachably mounted onto bar 10 by means of bolt and nut combinations 18, 20 and 22, 24. Washers 19 and 23, penetratingly supported by bolts 18 and 22, respectively, displace the spacer from the bar by a predetermined amount.

Before proceeding with a description of the operation of the present invention, a generalized review of the wheel supporting structure of motorcycles and the presently used wheel alignment method will be made with reference fo FIGS. 2 and 3. The rear wheel 30 of a motorcycle is normally attached to fork 32 of the chassis (a part of which is illustrated) by inserting and securing axle 31 within slot 33. Axle 36 of front wheel 35 is securely attached to fork 37. Presently, the widespread practice of aligning the front and rear wheels is a two step process. Wheel 30 is rearwardly positioned to obtain the requisite tautness of the drive chain. Thereafter, axle 31 is bolted to each slot within the fork to match one of several pairs of superimposed marks adjacent the slots. A general alignment is effected by this conventional alignment method but true alignment is a happenstance occurrence.

With the present day quality of motorcycle tires, it can be assumed that the points defining the maximum width of a tire lie in the same plane and define a circle upon each sidewall; this locus of points of maximum tire width is identified by dashed circle 40 upon sidewall 41 of tire 34. Similarly, the locus of points of maximum width of tire 38 is identified by dashed circle 45 on sidewall 46. If the two tires can be aligned with respect to one another such that the planes defined by locus 40 and locus 45 are parallel with one another, then the tires, and hence the wheels, are aligned with one another. By employing the teachings of the present invention, such parallelism of planes can be readily achieved.

By laying a straight edge across a chord of tire 34, the straight edge will contact locus 40 at points 51 and 52. Similarly, a straight edge laid across a chord of tire 38 will contact locus 45 at points 53 and 54. Necessarily, the respective straight edges will also lie within the respective planes of the loci. These indisputable theorems are adapted in the operation of the present invention.

For motorcycles having front and rear tires of equal width, bar 10 is positioned adjacent sidewall 41 of tire 34 at a height so as to define a chord of locus 40 without contacting spokes or chassis. The resulting points of contact are represented by numerals 51 and 52. Concurrent therewith, bar 10 will also be positioned adjacent sidewall 46 of tire 35. Thereafter, fork 37 is rotated about its axis in one direction or the other in an attempt to effect contact between bar 10 and locus 45 at points 53 and 54. Should both points of contact 53 and 54 not be achieveable while maintaining point contacts 51 and 52, the tires (and wheels) are not aligned with one another. To achieve alignment, the attachment of axle 31 within the slots are pivotally adjusted about the vertical axis until all four points of contact, 51, 52, 53 and 54 are achieved. Thereafter, the tautness of the rear wheel drive chain is checked and if too loose or too tight, the rear wheel is moved fore or aft while insuring that no pivotal movement about a vertical axis occurs. The method for aligning the wheels of a motorcycle by incorporating the present invention has now been completed and the wheels will track true.

For a number of reasons, the width of a motorcycle front tire and wheel is often less than the width of the rear tire and wheel. Accordingly, when the front and rear tires are aligned with one another, the plane defined by locus 40 of rear tire 34 is parallel to but displaced from the plane defined by locus 45 of front tire 38. To achieve parallelism between these two planes, spacer 12 is attached to one end of bar 10. Lateral alignment edge 13 (see FIG. 1) of spacer 12 is displaced from alignment edge 11 (see FIG. 1) of bar 10 at a distance equal to one-half the difference in width between the front and rear tires. This displacement is achieved by a combination of the width of the spacer and the cumulative width of washers 19 and 23 disposed intermediate the bar and the spacer. Thereafter, the alignment procedure described above is carried out until contact points 51 and 52 are achieved between tire 34 and bar 10 and contact points 53 and 54 are achieved between tire 38 and spacer 12. Thereby, aligned motorcycle wheels can be achieved by the present invention even though the width of the front and rear tires and wheels are not identical with one another.

FIGS. 4a, 4b, 4c and 4d illustrate various attachment combinations between bar 10 and spacer 12 to achieve a predetermined displacement between the lateral alignment edge of the bar and the lateral alignment edge of the spacer. In example, spacer 12a can be displaced from bar 10a by an amount commensurate with the number of washers 19a employed or there may be no spacing therebetween as shown in FIG. 4b; for only slight lateral displacement, the aligning surfaces of bar 10c and spacer 12c, an arrangement as shown in FIG. 4c may be utilized; and for a displacement less than the width of spacer 12d, an arrangement as illustrated in FIG. 4d is suitable.

Figure 7:
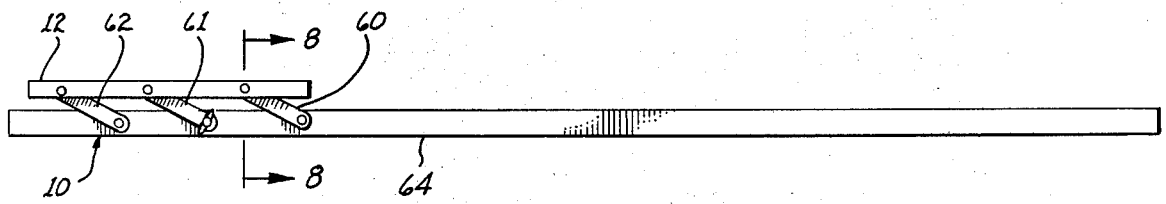
FIG. 7 is a top view of the variant illustrated in FIG. 5.
Figure 8:
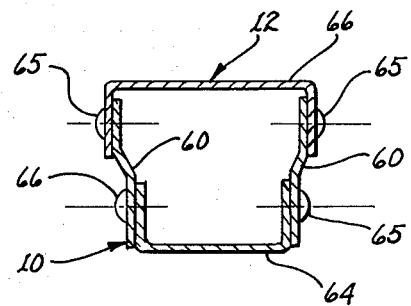
FIG. 8 is a cross-sectional view of the variant taken along lines 8—8, as shown in FIG. 7.

To avoid the necessity and inconvenience of repositioning the spacer by adding and subtracting washers, a spacer which is infinitely adjustable, as shown in FIGS. 5, 6, 7 and 8 may be employed. Herein, spacer 12 is attached to bar 10 by means of three pairs of pivotable straps 60, 61 and 62, which may be joggled as shown in FIGS. 7 and 8. The use of three pairs of straps insures, in accordance with well known mechanics, that spacer 12 will be maintained parallel to bar 10 during pivotal movement of the pairs of straps upon relative movement between the spacer and the bar.

The straps, except for one end of pair of straps 65, are attached to the respective spacer and bar by attachment means such as rivets 65 which accommodate pivotal movement of the straps. Thereby, on repositioning the spacer with respect to the bar along the longitudinal axis of the bar, the ensuring pivotal movement of the pairs of straps will bring the aligning edge 66 of spacer 12 toward or away from the aligning edge 67 of bar 10, as illustrated in FIGS. 7 and 8.

The lateral displacement between aligning edges 66 and 67, after being determined from the difference in width between the front and rear tires of a motorcycle, is adjusted and maintained by means of a bolt 68 engaging one end of pairs of straps and 61' with bar 10 and thumb screw 69. To insure a locking relationship between pair of straps and 61' and bar 10, a lock washer 70 may be used.

From the above description of the variant illustrated in FIGS. 5, 6, 7 and 8, it becomes apparent that this variant eliminates the complexity and the potentially misplaceable segregable elements illustrated in FIGS. 4a, 4b, 4c and 4d, while retaining the capability of positioning the alignment edge of the spacer at a predetermined lateral distance from the alignment edge of the bar. Moreover, this variant is continuously available for aligning equal sized tires of a motorcycle by employing rear surface 64 of bar 10 as the alignment edge.

While both the bar and the spacer have been illustrated as having channel cross-sections, many other cross-sectional configurations are equally readily employable, such as right angles, square tubing, or solid elements.

While the principles of the invention have now been made clear in an illustrative embodiment, there will be immediately obvious to those skilled in the art many modifications of structure, arrangement, proportions, elements, and components, used in the practice of the invention which are particularly adapted for specific environments and operating requirements without departing from those principles.

I claim:

1. An alignment tool for aligning the front and rear wheel mounted tires of a motorcycle having an alignment adjustment mechanism on one of the wheels, said tool comprising:

a. a first bar of a length sufficient to extend fore and aft along chords on one side of the sidewalls of the front and rear tires;

b. a first alignment edge disposed upon said bar for making contact on two points on the sidewall of the front wheel tire to define a plane orthogonal to the axis of the front wheel; and c. a spacer bar having at least an L-shaped cross section having second and third alignment edges disposed each being capable of bar for making contact on two points on the sidewall of the rear wheel tire to define a further plane orthogonal to the axis of the rear wheel;

d. means mounting said spaces bar on said first bar for discrete lateral adjustment parallel thereto, said mounting means being selectively connectable to either leg of said L-shaped cross section to permit selected use of said second and third alignment edges;

whereby, the front and rear wheel alignment is effected by setting the spacer bar at a predetermined position with respect to said first bar corresponding to the desired wheel alignment, and operating the alignment adjustment mechanism until each of the first and selected alignment edges makes contact with the two points on the respective sidewall to bring said plane into parallelism with said further plane.

2. The tool as defined in claim 1 wherein each said leg includes openings at two locations along the length of the spacer bar, and said mounting means includes bolts received by said openings to releasably fasten the spacer bar to the first bar.

3. The tool as defined in claim 2 wherein said mounting means includes washers for disposition on said bolts between the spacer bar and first bar to fix the distance of the selected alignment edge from the first bar.

4. The tool as defined in claim 2 wherein the spacer bar has a U-shaped cross section.

5. The tool as defined in claim 1 wherein said mounting means includes a plurality of discrete adjustment elements that are adjustable to locate the spacer bar at a predetermined distance from the first bar.

* * * * *